United States Patent
Higashino (10) Patent No.: US 6,456,575 B1
(45) Date of Patent: Sep. 24, 2002

(54) METHOD FOR RECORDING INFORMATION IN OPTICAL INFORMATION MEDIUM AND REPRODUCING INFORMATION THEREFROM

(75) Inventor: Hiroyuki Higashino, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/398,002

(22) Filed: Sep. 16, 1999

(30) Foreign Application Priority Data

Oct. 15, 1998 (JP) .......................................... 10-293712
Sep. 10, 1999 (JP) .......................................... 11-257706

(51) Int. Cl.$^7$ ............................................... G11B 7/00
(52) U.S. Cl. .................................... 369/47.51; 369/121
(58) Field of Search ............................... 369/44.37, 121, 369/120, 94, 47.51

(56) References Cited

U.S. PATENT DOCUMENTS

| | | | | |
|---|---|---|---|---|
| 5,396,480 A | * | 3/1995 | Morishita et al. ............ | 369/116 |
| 5,680,376 A | * | 10/1997 | Katayama et al. ............ | 369/32 |
| 5,808,986 A | * | 9/1998 | Jewell et al. ............ | 369/44.37 |
| 5,883,875 A | * | 3/1999 | Coufal et al. ............... | 369/116 |
| RE37,428 E | * | 10/2001 | Watanabe et al. ............. | 369/13 |

* cited by examiner

Primary Examiner—Nabil Hindi
(74) Attorney, Agent, or Firm—Pillsbury Winthrop LLP (57) ABSTRACT

An optical head apparatus is provided with a first laser element, a second laser element and a polarized beam splitter. The first laser element emits a laser beam having a first wavelength. The second laser element emits a laser beam having a second wavelength. The second wavelength may be equivalent to the first wavelength, alternatively, it may be different from the first wavelength. The polarized beam splitter enables the laser beams of the first and second laser elements to be simultaneously radiated to the recording layer of an optical disk. When information are recorded in the optical disk, the laser beams of the first and second laser elements are used at the same time. At least one of the laser elements emits a laser beam having such a wavelength as enables the recording layer of the optical disk to absorb the largest possible amount of energy.

1 Claim, 6 Drawing Sheets

METHOD FOR RECORDING INFORMATION IN OPTICAL INFORMATION MEDIUM AND REPRODUCING INFORMATION THEREFROM

BACKGROUND OF THE INVENTION

The present invention relates to an apparatus and method for recording information in a recordable optical information medium in which information can be additionally written only once and for reproducing information from the optical information medium.

When information are recorded or reproduced from an optical information medium, a recording beam, a tracking beam, a focusing beam and a reproduction beam are utilized. These optical beams are emitted from the same light source.

Among conventional optical recording/reproducing apparatuses, there is known an apparatus that can record and reproduce information with reference to various types of optical information mediums. To enable this, the apparatus is provided with a number of light sources for emitting optical beams of different wavelengths. The apparatus selects an optical beam that has the wavelength corresponding to the type of optical information medium in use, and uses the selected optical beam for the recording and reproduction of information. Even when this type of apparatus records and reproduces information with reference to an optical information medium, the optical beams used by the apparatus are from the same light source.

In recent years, the information-oriented society makes further progress, and the information processing apparatuses that are in general use can process information far faster than before. In accordance with this trend, there is a demand for recording/reproducing apparatuses that can record and reproduce information at far higher speeds. However, in the case of an optical recording/reproducing apparatus which is of a write-once type, the recording speed of the recording unit is slower than that the reproduction speed of the reproducing unit. As can be seen from this, the recording speed is generally lower than the reproduction speed in the present circumstances.

When information are recorded in a recordable optical information medium, the optical beam used for recording is of high energy, and the recording layer of the recording medium corresponds to such a wavelength as provides a great light absorption coefficient. Accordingly, recording pits can be formed with a low level of outputs. The reason for this will be described in more detail.

Let us assume that the moving speed of a recording head is V (m/s), the width of the recording light beam is D (m), the irradiation time of the recording light beam is $\Delta T$ (s), the output of the recording light beam is P (J/s), and the absorption coefficient of the recording layer of a recording beam is A. In this case, the amount of energy absorbed during the irradiation time $\Delta T$ (s) is represented as $P \times A \times \Delta T$, and the area in which the energy is absorbed during the irradiation time $\Delta T$ is represented as $V \times D \times \Delta T$. Accordingly, the average surface density W (J/m□) of the energy absorbed in area S is as follows:

$$(P \times A \times \Delta T)/(V \times D \times \Delta T) = (P \times A)/(V \times D)$$

Given that the value of D is constant, the average surface density of the energy absorbed in the recording layer is in proportion to the absorption coefficient and in inverse proportion to the moving speed of the recording head.

As can be seen from the above, higher recording density can be obtained by increasing the output of the recording optical beam or by applying a recording optical beam having such a waveform as provides high absorption coefficient.

When information are reproduced from a recordable optical information medium, the optical beam radiated to the medium must have such a wavelength as provides a high contrast between the beam reflected from the recording pits of the recording layer of the medium and the beam reflected from the areas other than the recording pits of the recording layer. The higher the contrast the optical beam provides, the higher will be the S/N ratio (signal-to-noise ratio) of a reproduction signal. The factors that should be considered to obtain a high contrast include the reflection factor of an optical beam, the polarization angle thereof, etc.

In general, optical beams of the same wavelength do not satisfy both the requirements of a recording beam and those of a reproducing beam.

Figure 2:
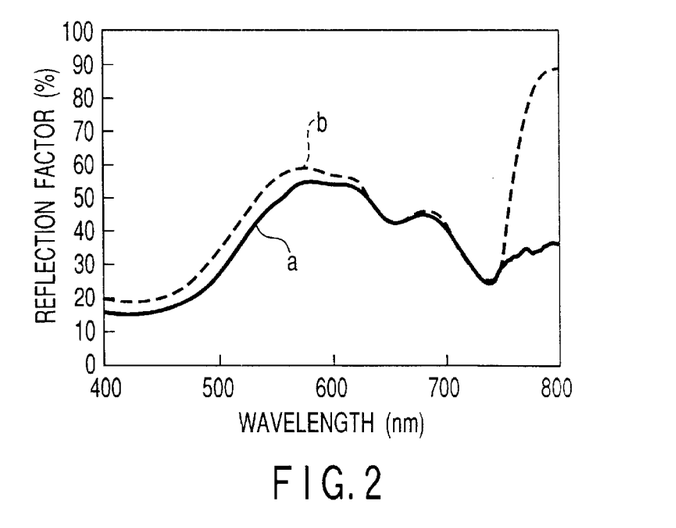
FIG. 2 is a graph showing the relationships showing how the wavelength of an optical beam is related to the reflection factor of the recording layer of an optical information medium in which information are recorded by the optical head apparatus shown in FIG. 1.

Among commercially-available recordable mediums, there is a medium whose recording layer is made up of a transparent support member arranged on the light-incident side, a metallic reflecting film, and a recording layer located between the support member and the metallic reflecting member and containing an organic pigment. When a light beam is radiated onto the recording layer, the energy the light beam has when it has passed the support member thermally changes the nature of the organic pigment. Since recording pits are thereby formed, information can be written only once. As shown in FIG. 2, the recording layer of this type of recording medium shows greatly different reflection factors between the case where a light beam having a wavelength close to that of near infra-ray light is incident on the recording pits and the case where the same light beam is incident on the areas other than the recording pits. When information are reproduced from this write-once recordable medium, a light beam which has a wavelength close to that of infra-red light and which does not vary in intensity with time is radiated onto the medium, and the amount of light reflected from the medium is monitored so as to check the difference between the amount of light reflected from the recording pits and the light reflected from the areas other than the recording pits. By monitoring the amounts of light reflected from the medium in this manner, the length of time during which the reflected light is intense and the length of time during which it is feeble are measured. In principle, the reflection factor of the above medium is about 80% when near infra-red light having a wavelength of 800 nm or thereabouts is incident on the areas other than the recording pits (i.e., unrecorded areas, curve b), and is about 40% when the same infra-red light is incident on the recording pits (i.e., the recording areas curve a). (These values of reflection factors are based on the assumption that the recording layer is a flat and smooth base member.)

Figure 3:
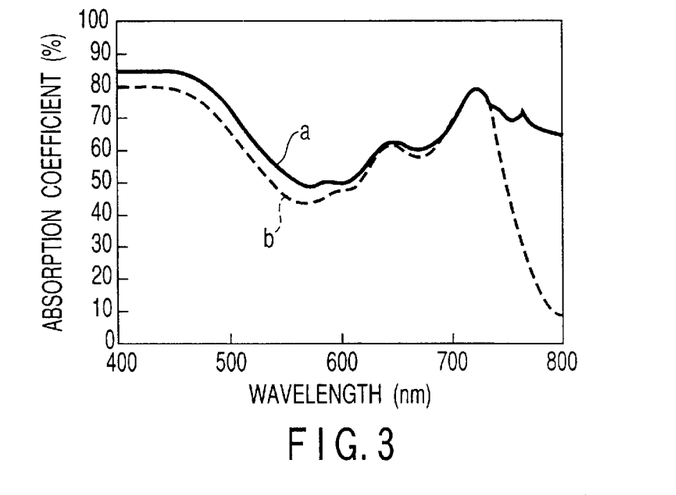
FIG. 3 is a graph showing the relationships showing how the wavelength of an optical beam is related to the energy absorption amount of the recording layer of the optical information medium in which information are recorded by the optical head apparatus shown in FIG. 1.

If a near infra-red light of the same wavelength as the reproducing beam described above is used for recording information in the unrecorded areas of the above recordable information medium, the absorption coefficient of the light beam is as low as 20% or so, as indicated by curve b in FIG. 3 (100%—[reflection factor]—[transmittance]) (the transmittance can be regarded 0% or so). With such a low absorption coefficient, the recording speed cannot be improved.

The write-once recordable information medium described above exhibits a small reflection factor for an optical beam having a wavelength which is within the wavelengths of visible light; in other words, it exhibits a great energy absorption coefficient for that optical beam. This means that, when used for the recording of information, the optical beam provides a high energy efficiency and consequently speeds up the recording speed. At the same time, however, the optical light-does not produce a significant difference between the amount of light reflected from the recording pits and the amount of light reflected from the areas other than the recording pits. This being so, an optical beam having the same wavelength as the recording beam cannot be used as a reproducing beam.

To solve this problem, Jpn. Pat. Appln. KOKAI Publication No. 2-187937 discloses a technique wherein information is recorded in a recording layer by using a recording beam whose wavelength provides the recording layer with a high optical absorbing coefficient and wherein the recorded information is reproduced from the recording layer by using a reproducing beam whose wavelength provides the recording layer with a low optical absorbing coefficient.

Even when the recording/reproducing method disclosed in KOKAI Publication No. 2-187937 is used, however, the wavelengths of optical beams must be different between the recording mode and the reproducing mode. In other words, a plurality of light sources must be provided, and one of them must be selectively used between the recording mode and the reproducing mode.

The recording/reproducing method disclosed in KOKAI Publication No. 2-187937 (i.e., the method wherein signals are recorded in a recording layer by using a recording beam whose wavelength provides the recording layer with a high optical absorbing coefficient and wherein the recorded signals are reproduced from the recording layer by using a reproducing beam whose wavelength provides the recording layer with a low optical absorbing coefficient) ensures a high S/N ratio of the reproduced signals and yet enables information to be recorded at higher speed. Even this method, however, is restricted by the energy of a maximum output of a light source. In the case where an information medium comprises an a recording layer having such a characteristic as is shown in FIG. 2, and information are recorded in the unrecorded areas of that recording layer, an optical beam that provides a high optical absorbing coefficient does not necessarily improve the recording speed.

As illustrated in FIG. 2, even where the absorbing coefficient of near infra-red light having a wavelength of 800 nm or so is about 20% for unrecorded areas, this absorbing coefficient increases to about 70% after information are actually recorded since the nature of the organic pigment is changed by the information recording. This being so, in the case where a recording beam having a wavelength that provides a low absorbing coefficient is radiated onto an unrecorded area, the absorbing coefficient of the recording layer is low immediately after the irradiation of the recording beam. In other words, the efficiency with which the energy is used is low at the start of the irradiation of the recording beam. As more and more recording pits are formed, however, the absorbing coefficient increases, and the efficiency with which the energy is used gradually increases. However, in the case where a recording beam having a wavelength that provides an absorbing coefficient of 50% or so is radiated onto the same unrecorded area, the absorbing coefficient does not increase. Hence, the recording speed is not improved.

Although a semiconductor laser is generally employed as a light source of an optical information recording/reproducing apparatus, the wavelength of the optical beam emitted thereby varies in accordance with the ambient temperature. If information are recorded by use of an optical beam having such a wavelength as results in a great change in the absorbing coefficient of the recording layer of the information medium, it is inevitable that the recording sensitivity will change greatly. To be more specific, the temperature of the semiconductor laser element changes due to variations in the ambient temperature, and the wavelength of the optical beam emitted by the semiconductor laser element inevitably changes. Since, therefore, the absorbing coefficient of the recording layer of the optical information medium greatly changes, the recording sensitivity is greatly changed, resulting in marked fluctuations at the time of information reproduction.

As described above, the laser element for emitting an optical beam having a waveform suitable for recording and the laser element for emitting an optical beam having a waveform suitable for reproducing are provided independently of each other. Accordingly, the adjustment needed for positioning the laser elements is hard to make and is thus costly.

It is known in the art that the optical beams emitted from the laser elements used for recording and reproduction cannot be focused on the same position without properly adjusting the relative position between the two laser elements (light sources) or the ratio between the focal distances of the collimator lens and the object lens.

To improve the recording density, the diameter $\omega_0$ of the beam spot which a recording optical beam forms on the recording surface (i.e., the diameter of zero-order light) must be as small as possible. In general, the diameter $\omega_0$ is determined as follows:

$$\omega_0 = 0.32\lambda/\sin\theta$$

where $\theta$ is the output angle of an optical beam output or emerging from the object lens. Let us assume that $\theta$ is 30° because this output angle is common. In this case, $\sin\theta$ is 0.5, so that the diameter $\omega_0$ is nearly equal to $0.6\lambda$. Even if $\theta$ is 90°, $\sin\theta$ is 1, so that the diameter $\omega_0$ is equal to $0.32\lambda$. In connection with this point, please refer to Formula (1–20) appearing on page 26 of "Optical Disk Technology", (Kabushiki Kaisha) Radio Gijutsu Sha, Feb. 10, 1989.

BRIEF SUMMARY OF THE INVENTION

It is accordingly an object of the present invention to provide an optical head apparatus which is adapted for use with an optical information medium ensuring a high recording speed and enabling stable reproduction of recorded signals, and which is used for recording/reproducing operations.

It is another object of the present invention to provide a technique which is applicable to an exposure system for emitting two optical beams and which causes the exposure system to project the two optical beams accurately on the same position to thereby enhance the energy efficiency and improve the recording speed.

It is still another object of the present invention is to provide a technique for producing a recording beam spot of small diameter and thereby improve the recording density.

To achieve the objects, the present invention provides an optical information recording/reproducing apparatus comprising a plurality of light sources, one of which emits an optical beam having such a wavelength as enables a larger amount of energy to be absorbed or reflected by recorded areas of a recording layer of an optical information medium than an amount of energy absorbed or reflected by non-recorded areas, said plurality of light sources emitting optical beams simultaneously to record information in an information recording mode.

The present invention also provides an information recording/reproducing apparatus comprising:

a plurality of light sources; and an optical system for enabling optical beams from the light sources to be focused on a single point on the recording surface of an optical information medium, the optical system including an object lens having a focal distance of F1 and a collimator lens having a focal distance of F2, F2/F1 being within a range of 4 to 10.

The present invention further provides an information recording/reproducing apparatus comprising:

a first light source for emitting an optical beam of a first wavelength;

a second light source for emitting an optical beam of a second wavelength different from the first wavelength;

an optical system for guiding the optical beams from the first and second light sources along substantially one optical path, the optical system including a prism unit for synthesizing the optical beams from the first and second light sources together;

a detector for performing photoelectric conversion with respect to optical beams that are reflected by an optical information medium and guided to the detector by way of the object lens; and a beam diameter varying device, arranged between the first and second light sources and the prism unit, for varying a beam spot diameter of an optical beam emitted from one of the first and second light sources.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An optical head apparatus (i.e., an optical information recording/reproducing apparatus), which is one embodiment of the present invention and which records information in an optical information medium and reproduces information therefrom, will now be described with reference to the accompanying drawings, along with an information recording/reproducing method used in that apparatus.

Figure 1:
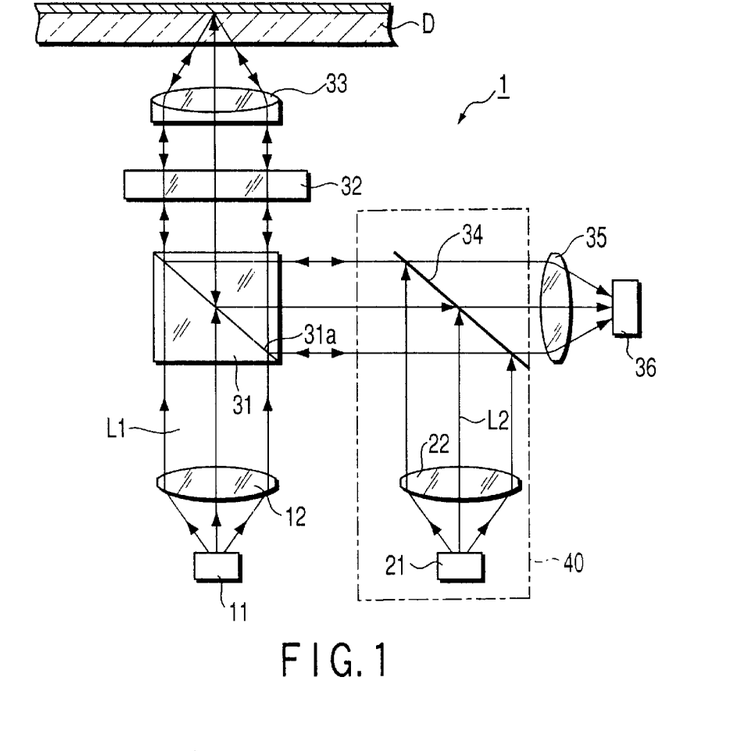
FIG. 1 is a schematic illustration showing an optical head apparatus according to one embodiment of the present invention.

As shown in FIG. 1, an optical head apparatus 1 comprises a first semiconductor element 11 for emitting a laser beam (optical beam) L1 having a first wavelength and a second semiconductor element 21 for emitting a laser beam (optical beam) L2 having a second wavelength.

The semiconductor laser elements 11 and 12 are arranged in such a manner that the polarization directions of the laser beams L1 and L2 emitted from them are at right angles to each other.

The laser beam L1 emitted from the first semiconductor laser element 11 is first collimated by a first collimator lens 12 and then passes through the polarized beam-splitting face 31a of a polarized beam splitter 31. Subsequently, the laser beam L1 is incident on a λ/4 plate (retarder) 32, by which the direction of polarization is changed from linear polarization to circular polarization. Thereafter, the laser beam L1 is guided to an object lens 33.

By the object lens 33, the laser beam L1 is focused on the recording layer (not shown) of an optical disk (i.e., an optical information medium). The recording layer is a pigment layer interposed between a transparent support member and a reflecting film. The object lens 33 is an achromatic lens, which is achromatic with reference to both the wavelength of the laser beam L1 emitted from the first laser element 11 and the wavelength of the laser beam L2 emitted from the second laser element 21.

The laser beam L1 focused on the recording layer of the optical disk D is reflected by the reflecting film and returned to the object lens 33. Then, the laser beam L1 is incident on the λ/4 plate 32 once again, by which the direction of polarization is changed from circular polarization to linear polarization. The direction of linear polarization is 90° shifted from that of the laser beam L1 that is directed to the optical disk D. Thereafter, the laser beam L1 is returned to the polarized beam splitter 31.

The laser beam L1 returned to the polarized beam splitter 31 is reflected by the polarized beam-splitting face 31a and then passes through a half-mirror beam splitter 34, the transmittance of which is about 20%. The laser beam L1 is focused by a focusing lens 35 and is then incident on the light receiving face (not shown) of a photodetector 36.

On the other hand, the laser beam L2 emitted from the second semiconductor laser element 21 is first collimated by a second collimator lens 22 and is then incident on the half-mirror beam splitter 34. About 80% of the laser beam L2 (the percentage being determined in terms of the optical intensity) is reflected by the half-mirror beam splitter 34 and guided to the polarized beam splitter 31. (It is desirable that at least three fourths of the laser beam be reflected by the half-mirror beam splitter 34.

The laser beam L2 from the second semiconductor laser element 21 is reflected again by the polarized beam-splitting face 31a of a polarized beam splitter 31. (The laser beam L2 is reflected since its direction of polarization is 90° shifted from that of the laser beam L1 emitted from the first semiconductor laser element 11.) The reflected laser beam is incident on the λ/4 plate (retarder) 32, by which the direction of polarization is changed from linear polarization to circular polarization. Thereafter, the laser beam L2 is guided to the object lens 33.

By the object lens 33, the laser beam L2 from the second semiconductor laser element 21 is focused on the recording layer (not shown) of the optical disk D. (The recording layer is a pigment layer interposed between the transparent support member and the reflecting film.)

The laser beam L2 emitted from the second semiconductor laser element 21 and focused on the recording layer of the optical disk D is reflected by the reflecting film and returned to the object lens 33. Then, the laser beam L1 is incident on the λ/4 plate 32 once again, by which the direction of polarization is changed from circular polarization to linear polarization. The direction of linear polarization is 90° shifted from that of the laser beam L2 that is directed to the optical disk D. Thereafter, the laser beam L2 is returned to the polarized beam splitter 31. The laser beam L2 passes through the polarized beam splitter 31 and output therefrom toward the first laser element 11. In order to prevent the laser beam L2 from falling on a photodetector of the first laser element 11 (the photodetector being incorporated for auto-power control (APC)), the laser beam L2 is changed in its traveling direction by an optical path-changing member. Alternatively, the laser beam L2 is shielded by a shielding member.

The optical head apparatus shown in FIG. 1 is an example made up of collimator lenses 12 and 22, a λ/4 plate 32, and a polarized beam splitter 31. The optical head apparatus may be designed in a similar way without employing the λ/4 plate 32 or the polarized beam splitter 31.

To be more specific, optical head apparatuses adapted for most desired applications can be assembled by adding the second laser element 21 and the half-mirror beam splitter 34 (i.e., the structural elements enclosed by broken lines 40 in FIG. 1) to an ordinary optical head apparatus comprising a known semiconductor laser.

As described above with reference to FIGS. 2 and 3, a write-once recordable information medium differs distinctly from other types of information mediums in that the laser beam suitable for the recording of information and the laser beam suitable for the reproduction of information are different in wavelength.

In the optical head apparatus shown in FIG. 1, the speed for recording information can be increased by properly combining the wavelengths of the laser beams L1 and L2 emitted from the first and second laser elements 11 and 21. For example, the wavelength of the laser beam L2 emitted from the second laser element 21 may be determined in such a manner that the amount of energy absorbed in the recording layer of an information medium becomes largest.

Figure 4A:
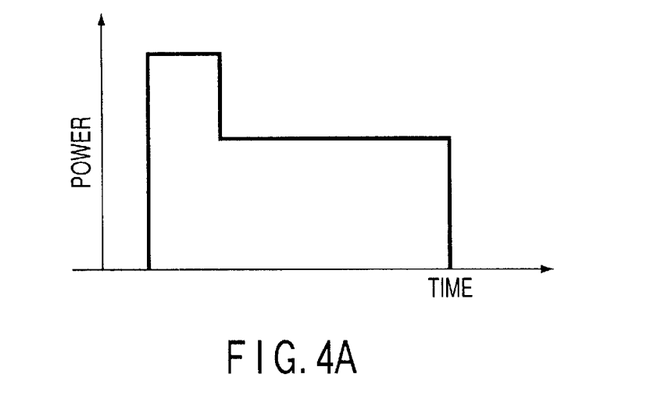
FIGS. 4A and 4B are timing charts showing how laser beam emission timing of a laser element is controlled when information are recorded by the optical head apparatus shown in FIG. 1.

A further specific technique about this wavelength determination can be understood from the energy absorbing characteristic of an optical information medium described above with reference to FIG. 3. As described, even where the absorbing coefficient of near infra-red light having a wavelength of 800 nm or so is about 20% (curve b) for unrecorded areas, this absorbing coefficient increases to about 70% (curve b in FIG. 2) after information are actually recorded, since the nature of the pigment film is changed by the information recording. This being so, in the case where a recording beam having a wavelength that provides a low absorbing coefficient is radiated onto an unrecorded area, the absorbing coefficient of the recording layer is low immediately after the irradiation of the recording beam. In other words, the efficiency with which the energy is used is low at the start of the irradiation of the recording beam. As more and more recording pits are formed, however, the absorbing coefficient increases, and the efficiency with which the energy is used gradually increases, resulting in an increase in the information recording speed. The laser beam L2 emitted from the second laser element 21 then is controlled in the manner shown in FIG. 4A. As shown in this Figure, the laser beam L2 is high in level at the start of information recording, and is then lowered to a predetermined level after a predetermined length of time. With the light emission controlled in this manner, the recording pits formed in the recording medium do not increase in width with time.

The optical information medium used in the present invention may be a recordable information medium commercially available. To be more specific, the optical information medium to which the present invention is applicable is of a type comprising a spiral groove (guide groove). The width of the groove is 0.8 $\mu$m or so, the depth thereof is 0.1 $\mu$m or so, and the pitch thereof is 1.6 $\mu$m or so. The optical information is made up of a transparent plastic plate, a recording layer, and a protective layer. The plastic plate has a diameter of 120 mm and a thickness of 1.2 mm. The recording layer includes an organic pigment film with a thickness of 0.1 $\mu$m or so, and a reflecting film made of Au and having a thickness of 50 nm or so. The protective layer is formed, for example, of a resin that sets upon ultraviolet radiation. In short, the optical information medium is a known type of optical disk generally referred to as CD-R.

The organic pigment film of the CD-R described above is formed of an organic material, such as a cyanine material, a phthalocyanine material, or an azo-group material. By using a material of these kinds, a high contrast is produced between the recording areas (i.e., recording pits, which will be described in detail later) and the unrecorded areas (i.e., the areas other than the recording pits) when a reproduction laser beam having a wavelength of that of near infrared light is radiated to the areas.

A detailed description will now be given as to how information are written in a CD-R and how they are reproduced from the CD-R. The methods described below is advantageous in that the energy of a laser beam can be efficiently absorbed in a recording layer at the time of recording without adversely affecting the S/N ratio of reproduced signals, and the recording speed is consequently improved.

[Method 1]

In the optical head apparatus shown in FIG. 1, the emission wavelengths of the first and second semiconductor laser elements 11 and 12 are determined to be 780 nm.

By use of a known type of control circuit (not shown), recording signals are supplied to the two semiconductor laser elements 11 and 12 in parallel to each other, and the semiconductor laser elements are driven simultaneously.

This does not necessarily mean that the amount of energy applied to the recording layer is double. In comparison with the case where only one of the laser elements is driven, the amount of energy applied to the recording layer can be regarded as being large. It should be noted that the amount of reflected light guided to the photodetector 36 is smaller than the corresponding amount of a known-type of optical head apparatus. It is therefore preferable that the amplification factor of an amplifier (not shown) be set at a large value.

In a known-type of optical head apparatus, the amount of energy that can be used from a laser beam spot focused on an optical information medium is about ¼ of the total energy which the laser beam has when it is emitted from the laser element. In addition, the allowable radiation capacity of an ordinary type of semiconductor laser that emits a laser beam having a wavelength of 780 nm is 50 mW or so in the case of intermittent radiation. Therefore, the maximum of energy radiated to the recording layer is 12 mW or so.

Based on this condition, the linear velocity (rotating speed) of the CD-R was increased from 1 m/sec to 20 m/sec, and the length and interval of recording pulses were varied in accordance with the linear velocity. In this state, laser beams, the total amount of which was 20 mW, were radiated to the CD-R from the two semiconductor laser elements. With respect to this sample, the amount of reflected light was monitored by tracing a 0.1 mW beam along recorded track. As a result, it was confirmed that reliably modulated signals were obtained up to a linear velocity of 20 m/sec.

For comparison, one of the two laser elements was stopped, and a similar sample was made by radiating a laser beam in an amount of 12 mW. With respect to this sample, the amount of reflected light was monitored by tracing a 0.1 mW beam along recorded track. As a result, it was confirmed that reliably modulated signals were obtained up to a linear velocity of 7 m/sec.

Hence, it was confirmed that the simultaneous radiation of laser beams from two semiconductor laser elements of the same emission wavelength provides a faster recording speed than the conventional recording apparatus and method that use a single laser element.

[Method 2]

In the optical head apparatus 1 shown in FIG. 1, a semiconductor laser element capable of emitting a laser beam having a wavelength of 780 nm is used as one of the two semiconductor laser elements, and a semi-conductor laser element capable of emitting a laser beam having a wavelength of 730 nm is used as the other. The collimator lenses 12 and 22 for collimating the laser beams L1 and L2 from the laser elements also function as achromatic lenses. In other words, the collimator lenses 12 and 22 are achromatic with reference to the wavelengths of the corresponding laser beams L1 and L2 and the wavelengths which are close to them. Such collimator lenses help suppress the adverse effects which the laser beam passing through the polarized beam splitter 31 may produce when it is incident on the unrelated laser element.

Figure 4B:
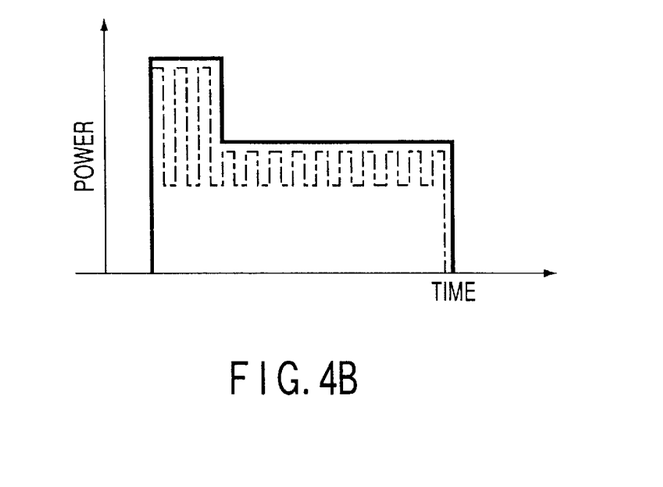

The laser beam having a wavelength of 780 nm is radiated at all times without fluctuations, and the laser beam radiated in this manner is used for both tracking and focusing in a known manner. The laser beam having a wavelength of 730 nm is radiated intermittently. The radiation of the laser beams emitted from the laser elements (i.e., the light emission timing) is controlled in the manner shown in FIG. 4B. As shown in this Figure, the output level of the laser beams is high at the start of recording, and is lowered after the elapse of a predetermined time. With the light emission controlled in this manner, the recording pits formed in the recording medium do not increase in width with time. As is apparent from FIG. 4B, the laser beam of 730 nm is not radiated at a constant level at all times. In other words, the output level of the laser beam varies within a predetermined range.

When the laser beam having a wavelength of 730 nm is radiated at the time of recording, the laser beam having 780 nm is also radiated. Accordingly, the two laser beams from the laser elements constitute a recording beam. At the time of reproduction, only the laser bean having a wavelength of 780 nm is radiated without intermittence.

According to Method 2, the laser beam having a wavelength of 780 nm and the laser beam having a wavelength of 730 nm can be used for recording simultaneously. As described above, the absorbing coefficient of a laser beam having a wavelength of 780 nm is about 20% for unrecorded areas, this absorbing coefficient increases to about 60% after information are actually recorded. In this manner, the energy absorption coefficient is improved in accordance with an increase in the number of pits that are formed. Accordingly, even a laser beam having such a wavelength as does not provide a large absorption coefficient of the recording layer at the time of recording can improve the recording efficiency, and the recording speed can be enhanced.

Based on this condition, one of the light sources was controlled to emit a laser beam having a wavelength of 780 nm without intermittence in an amount of 2 mW. The other light source was controlled to emit a laser beam having a wavelength of 730 nm intermittently in an amount of 10 mW. The linear velocity of the CD-R was increased from 1 m/sec to 20 m/sec, and the length and interval of recording pulses were varied in accordance with the linear velocity. (A laser beam having a wavelength of 730 and amounting to 0.3 mW was used for tracking and focusing when recording was not effected.) With respect to the sample thus obtained, the amount of reflected light was monitored by tracing a 0.1 mW beam of 780 nm along recorded track. As a result, it was confirmed that reliably modulated signals were obtained up to a linear velocity of 15 m/sec.

For comparison, another sample was prepared by using the laser beam having a wavelength of 730 nm. When making the second sample, the linear velocity was increased from 1 m/sec to 20 m/sec, and the length and interval of recording pulses were varied in accordance with the linear velocity. The laser beam for recording was radiated intermittently in an amount of 10 mW. (A laser beam having a wavelength of 730 and amounting to 0.3 mW was used for tracking and focusing when recording was not effected.) With respect to the second sample thus obtained, the amount of reflected light was monitored by tracing a laser beam having a laser beam 780 nm along recorded track. As a result, it was confirmed that reliably modulated signals were obtained up to a linear velocity of 10 m/sec.

As can be seen from the description given with reference to Method 2, a laser beam that provides a small absorption coefficient for unrecorded areas must be used at the time of reproduction. In other words, the wavelength of a laser beam for reproduction must be within a certain range to produce reliable reproduction signals. This being so, a method that also employs a laser element originally intended to emit a reproduction laser beam is disadvantageous in that the wavelength of the reproduction laser beam cannot be determined arbitrarily. In regard to the wavelength of the other laser beam for recording, it can be arbitrarily determined as long as it is within ±10 nm of the wavelength that provides a maximal absorption coefficient for the recording medium and it does not result in variations in the absorption coefficient. If only a laser beam having such a wavelength can be emitted, the semiconductor laser element employed cab be determined without restrictions.

As can be seen from the above, an optical head apparatus that provides a high recording speed and ensures reliable reproduction signal can be realized by employing two semiconductor laser elements which emit laser beams of different wavelengths and by controlling the emission wavelength of one of the two laser elements to be within ±10 nm of the wavelength that provides a maximal absorption coefficient for the recording layer of the recording medium and controlling the emission wavelength of the other laser element to be most suitable for reproducing information from the recording medium.

Next, consideration will be given to an optical head apparatus capable of coping with a variation which the wavelength of a laser beam emitted from a semiconductor laser element may have due to the changes in ambient temperature.

In the consideration given below, reference will be made to the case where information are recorded in an optical information medium having the absorption/reflection characteristics described above with reference to FIGS. 2 and 3. For the recording of information, the optical head apparatus shown in FIG. 1 is employed, wherein the first and second semiconductor laser elements emit laser beams whose wavelengths are 780 nm and 720 nm, respectively.

In the case where the recording layer of a recording medium has such absorption/reflection characteristics as shown in FIGS. 2 and 3, the absorption coefficient is about 23% with respect to the laser beam emitted from the first laser element and having a wavelength of 780 nm. If the wavelength of this laser beam deviates ±10 nm from 780 nm, the absorption coefficient changes to 17–36%. Assuming that the original absorption coefficient of 23% is 100, the absorption coefficient after the change is 74% to 147% (the range rate of the absorption coefficient is −26% to +47%). On the other hand, the absorption coefficient is about 64% (which indicates high energy efficiency) with respect to the laser beam emitted from the second laser element and having a wavelength of 720 nm. If the wavelength of this laser beam deviates ±10 nm from 720 nm, the absorption coefficient changes to 56–71%. Assuming that the original absorption coefficient of 64% is 100, the absorption coefficient after the change is 88% to 110% (the range rate of the absorption coefficient is −12% to +11%).

As described above, even when the wavelengths of the laser beams of the two laser elements change within the range of ±10 nm, the change rate of the absorption coefficient of the information medium may not always within the range of ±10 nm.

As can be seen from the foregoing, even when information are recorded using a laser beam of the same level, the emission wavelength of that wavelength may vary due to changes in the ambient temperature of the laser element a change in the emission wavelength of the laser beam. Even if the variation in the emission wavelength is within the range of ±10 nm, a change in the recording sensitivity is not always within the range of ±10 nm. In other words, recording pits of optimal size cannot be easily formed based on the control of recording outputs. Incidentally, recording pits are considered to have optimal size when fluctuations in the reproduction signals read therefrom are a minimum.

In the optical information reproduction, the length of a recording pit and the length of an unrecorded area are detected as signals. If the recording sensitivity changes, the recording pits and unrecorded areas will have different lengths, resulting in an increase in the fluctuations.

If the degree of fluctuation is higher than an allowable value, accurate reproduction will not be possible. Since, therefore, the recording pits must be controlled to have optimal size, there is a demand for a recording method that enables recording pits to be accurately formed without reference to changes in the wavelength of a laser beam by merely executing output control of that laser beam.

Such a method can be easily attained by use of the technology described above in relation to Method 2. As described, the technology uses two semiconductor laser elements which emit laser beams of different wavelengths, the emission wavelength of one of which being controlled to be within ±10 nm of the wavelength that provides a maximal absorption coefficient for a recording medium, and the emission wavelength of the other laser element being controlled to be most suitable for reproducing information from the recording medium. The change rate of the absorption coefficient of the recording medium should be preferably within the range of ±5%, and the output wavelengths of the laser elements are controlled, accordingly.

Figure 5:
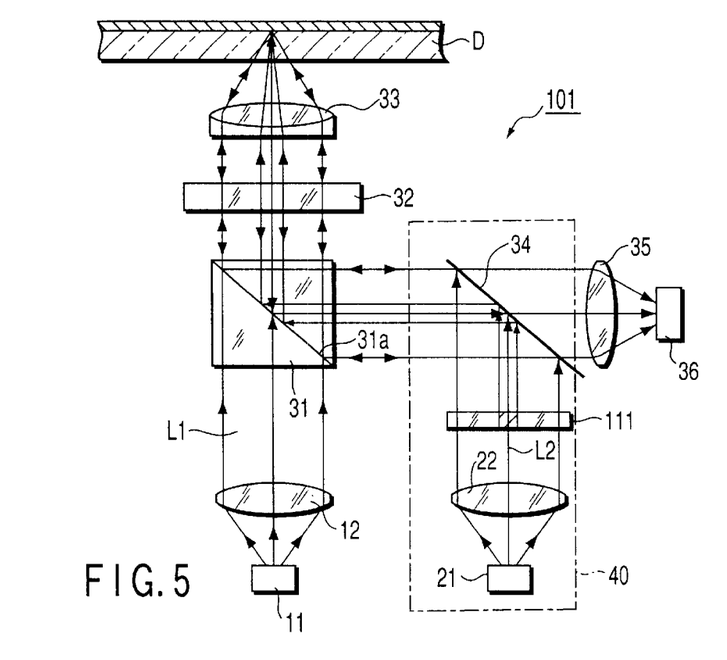
FIG. 5 is a schematic illustration showing a modification of the optical head apparatus shown in FIG. 1.

FIG. 5 is a schematic illustration showing a modification of the optical head apparatus shown in FIG. 1. In FIG. 5, those structural elements similar to those shown in FIG. 1 are denoted by the same reference numerals, and a detailed description of such structural elements will be omitted.

As shown in FIG. 5, an optical head apparatus 101 comprises a first semiconductor element 11 for emitting a laser beam (optical beam) L1 having a first wavelength and a second semiconductor element 21 for emitting a laser beam (optical beam) L2 having a second wavelength.

The semiconductor laser elements 11 and 12 are arranged in such a manner that the polarization directions of the laser beams L1 and L2 emitted from them are at right angles to each other.

The laser beam L1 emitted from the first semiconductor laser element 11 is first collimated by a first collimator lens 12 and then passes through the polarized beam-splitting face 31a of the polarized beam splitter 31. Subsequently, the laser beam L1 is incident on a λ/4 plate (retarder) 32, by which the direction of polarization is changed from linear polarization to circular polarization. Thereafter, the laser beam L1 is guided to an object lens 33.

By the object lens 33, the laser beam L1 is focused on the recording layer (not shown) of an optical disk (i.e., an optical information medium). The recording layer is a pigment layer interposed between a transparent support member and a reflecting film.

The laser beam L1 focused on the recording layer of the optical disk D is reflected by the reflecting film and returned to the object lens 33. Then, the laser beam L1 is incident on the λ/4 plate 32 once again, by which the direction of polarization is changed from circular polarization to linear polarization. The direction of this linear polarization is 90° shifted from that of the laser beam L1 that is directed to the optical disk D. Thereafter, the laser beam L1 is returned to the polarized beam splitter 31.

The laser beam L1 returned to the polarized beam splitter 31 is reflected by the polarized beam-splitting face 31a and then passes through a half-mirror beam splitter 34, the transmittance of which is about 20%. The laser beam L1 is focused by a focusing lens 35 and is then incident on the light receiving face (not shown) of a photodetector 36.

On the other hand, the laser beam L2 emitted from the second semiconductor laser element 21 is first collimated by a second collimator lens 22 and is then incident on an apodization plate 111. By this plate 111, a central portion of the collimated beam, as viewed in a cross section, is shielded at a predetermined rate. In other words, the cross sectional diameter of the collimated beam is reduced to a small value in comparison to that of an ordinary laser beam. (The cross sectional diameter is defined as energy intensity.) After the diameter defined as energy intensity is reduced in this manner, the laser beam L2 is incident on the half-mirror beam splitter 34. About 80% of the laser beam L2 (the percentage being determined in terms of the optical intensity) is reflected by the half-mirror beam splitter 34 and guided to the polarized beam splitter 31. (It is desirable that at least three fourths of the laser beam be reflected by the half-mirror beam splitter 34.)

The laser beam L2 from the second semiconductor laser element 21 is reflected again by the polarized beam-splitting face 31a of the polarized beam splitter 31. (The laser beam L2 is reflected since its direction of polarization is 90° shifted from that of the laser beam L1 emitted from the first semiconductor laser element 11.) The reflected laser beam is incident on the λ/4 plate 32, by which the direction of polarization is changed from linear polarization to circular polarization. Thereafter, the laser beam L2 is guided to the object lens 33.

By the object lens 33, the laser beam L2 from the second semiconductor laser element 21 is focused on the recording layer (not shown) of the optical disk D. (The recording layer is a pigment layer interposed between the transparent support member and the reflecting film.)

The laser beam L2 emitted from the second semiconductor laser element 21 and focused on the recording layer of the optical disk D is reflected by the reflecting film and returned to the object lens 33. Then, the laser beam L1 is incident on the λ/4 plate 32 once again, by which the direction of polarization is changed from circular polarization to linear polarization. The direction of linear polarization is 90° shifted from that of the laser beam L2 that is directed to the optical disk D. Thereafter, the laser beam L2 is returned to the polarized beam splitter 31.

Figure 6A:
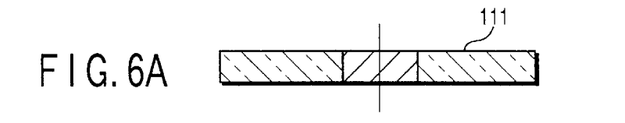
FIG. 6A is a schematic illustration showing an apodization plate incorporated in the optical head apparatus shown in FIG. 5.

FIG. 6A is a schematic illustration showing an apodization plate incorporated in the optical head apparatus shown in FIG. 5.

Figure 6B:
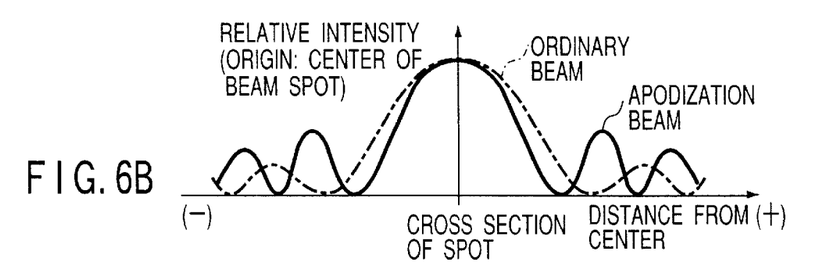
FIG. 6B is a schematic illustration showing how energy is distributed in a beam spot which is provided by the apodization plate depicted in FIG. 6A.
Figure 7:
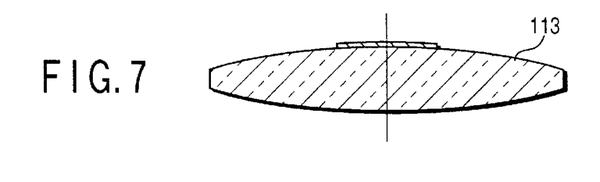
FIG. 7 is a schematic illustration showing an example of a compound lens having a similar function to that of the apodization plate depicted in FIG. 6A.

FIG. 6A shows a section the apodization plate 111 has in the direction perpendicular to the optical axis. As shown in FIG. 6A, the central portion of the apodization plate 111 is made of a thin metal film for shielding light. The ratio of the thin metal film portion to the entire plate 111 is predetermined. FIG. 6B shows how the energy distribution of a laser beam is after the laser beam passes through the plate 111. As shown in FIG. 6B, the primary-order optical ring is larger than that of an ordinary laser beam, but the diameter of the zero-order optical ring is reduced. The zero-order optical ring reduced in diameter is suitable for use as a recording beam. The laser beam L1 emitted from the first laser element 11 is suitable for use as a tracking laser beam since the diameter of the entire cross section is smaller than the diameter of the laser beam L2 that is made to pass through the apodization plate 111. It should be noted that the apodization plate 111 need not be arranged at such a position as shown in FIG. 5; it can be arranged at any desirable position as long as the function required of it is attained. As shown in FIG. 7, a complex lens comprising a collimator lens and an apodization plate may be used.

The optical head apparatus 101 shown in FIG. 5 employs a spot moving mechanism (not shown). By means of this mechanism, the beam spots of the first and second laser beams L1 and L2 are located at their respective predetermined positions on the recording surface of the recording medium D. With tracking control being executed by use of the first laser beam L1 (which is suitable for tracking), information are recorded in the recording surface of the recording medium D by use of the second laser beam L2 which is made to pass through the apodization plate 111. In order for the two beam spots to be formed on the same track of the recording surface at predetermined intervals (with a spacing of 10 μm, for example), the first laser element 11, the second laser element 21, the polarized beam splitter 31 and the half-mirror beam splitter 34 are arranged. By adequately arranging these structural elements, the optical system enables a recording beam to reach the track after a tracking beam. Owing to this feature, it is possible to form very tiny pits. Even when information are recorded, with the pits formed at very short intervals, the information reproduced from such pits hardly deteriorate in quality. This feature is effective in enhancing the recording density. By properly arranging the above-mentioned structural elements, the optical system enables the beam spots of the two laser beams to overlap with each other. In this case, the pits will be somewhat large, but they are nonetheless smaller than pits formed by light beams that do not pass through the apodization plate 111. At the time of recording, the powers of the two laser beams can be synthesized together, and the recording speed is therefore enhanced.

A description will now be given of a manner in which the optical head apparatus shown in FIG. 5 operates.

Figure 8A:
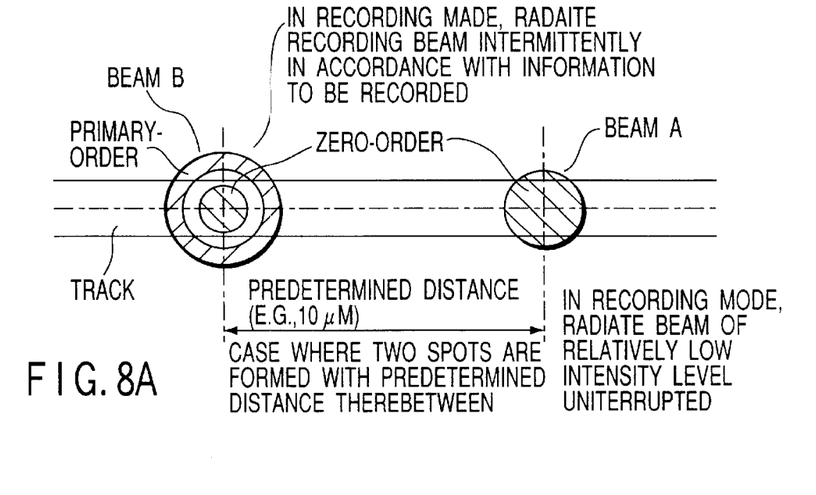
FIG. 8A shows how a beam which is made to pass through the apodization plate depicted in FIG. 6A and a beam which is not made to pass through the same apodization plate form spots on a track of an optical information medium.

FIG. 8A shows a case where the first and second beam spots A and B emitted from the first and second laser elements 11 and 21, respectively, are radiated to the track with a predetermined spacing (e.g., 10 μm). In this case, the emission wavelengths of the first and second laser elements 11 and 21 are set at 660 nm.

Figure 8B:
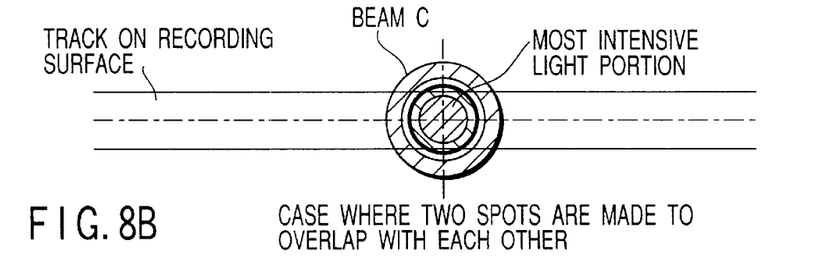
FIG. 8B is a schematic illustration showing how the beam which is made to pass through the apodization plate depicted in FIG. 6A and the beam which is not made to pass through the same apodization plate are synthesized together on the track.

FIG. 8B shows a case where the first and second beam spots A and B are radiated to the same position and overlap with each other. In this case, the zero-order optical ring, whose energy is concentrated by the apodization plate 111, is located inside the beam spot formed by an ordinary beam, thereby forming an optically-intensive area C. The primary-order optical ring, which is produced by the apodization plate 111 and is optically weak, is radiated to the areas outside the beam spot of the ordinary beam.

The power control for the two laser beams can be performed in one of the following four ways:

(1) The power of the laser beam subjected to apodization is used for recording and is modulated in intensity in accordance with recording signals, and the power of the ordinary beam is used for reproducing;

(2) The power of the laser beam subjected to apodization is used for recording and is modulated in intensity in accordance with recording signals, and the power of the ordinary beam is used as intermediate power (which is more intense than the power of a beam for reproducing, but is not insufficient for recording);

(3) The power of the laser beam subjected to apodization is sufficient for recording and is modulated in intensity in accordance with information to be recorded. Likewise, the power of the ordinary beam is used for recording and is modulated in intensity in accordance with information to be recorded. Further, a beam whose power is predetermined and intermediate between the power of the recording beam and the power of the ordinary beam used for recording, is used as a read beam (the power of which cannot be used for recording); and (4) The power of the laser beam subjected to apodization beam is determined at intermediate level in such a manner that information cannot be recorded without simultaneous radiation of them. Likewise, the power of the ordinary beam is used for recording and is modulated in intensity in accordance with information to be recorded. And the power of the ordinary beam is intermediate between the powers of the two recording beams (one of which is the ordinary beam that is modulated in intensity in accordance with information to be recorded) is used as a read beam, and the power of this read beam is predetermined to be insufficient for the recording of information.

In the case where the information recording medium is a rewritable type, the use of two beams is advantageous in that recorded information can be erased from the information medium by use of one beam, and new information can be written therein by use of the other beam. In comparison with the conventional art wherein a single beam is utilized, the power control system can be as simple as possible. (In the case where a single beam is utilized, three-stage power control is required.)

Figure 9:
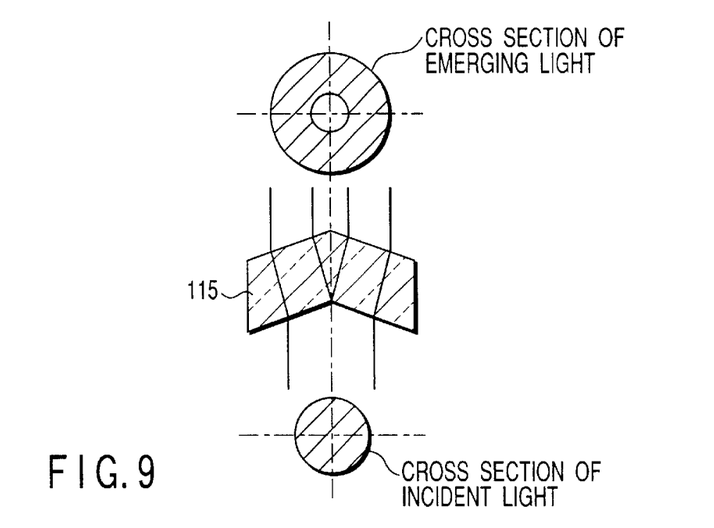
FIG. 9 is a schematic illustration showing a rotatable prism which provides a lower degree of optical loss than that of the apodization plate depicted in FIG. 6A.

FIG. 9 is a schematic illustration showing an optical element which can be used in place of the apodization plate described above.

As can be seen from FIG. 9, if a rotatable prism 115 whose section is either a parallelogram or a rectangle is used, a beam spot capable of generating apodization can be formed without reducing the amount of light. (In the case where the apodization plate 111 is used, the energy corresponding to the shielded laser beam component is inevitably lost.)

Figure 10:
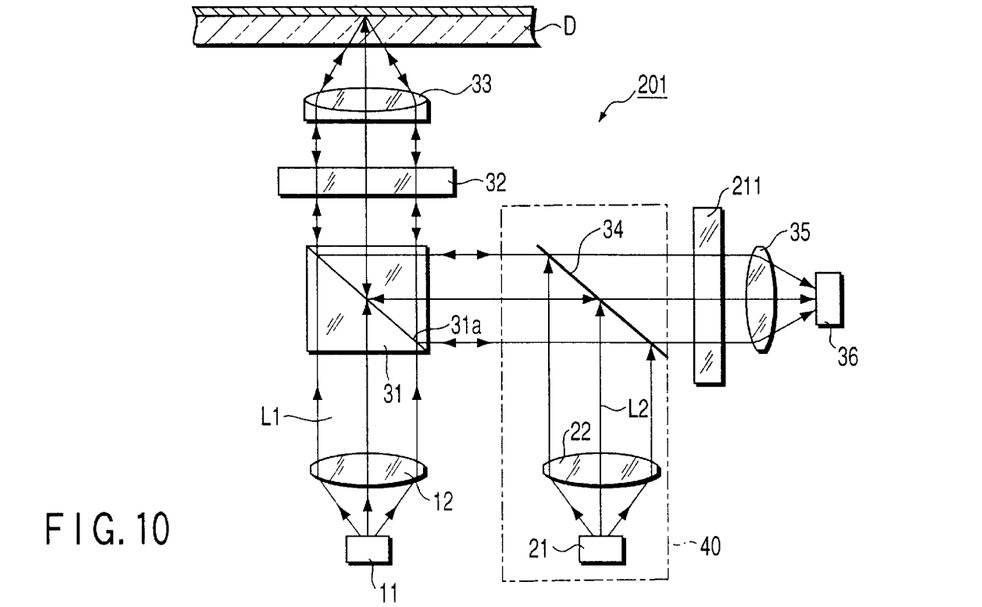
FIG. 10 is a schematic illustration showing a modification of the optical head apparatus depicted in FIG. 5.

FIG. 10 is a schematic illustration showing a modification of the optical head apparatus depicted in FIG. 5. In FIG. 10, those structural elements similar to those shown in FIG. 5 are denoted by the same reference numerals, and a detailed description of such structural elements will be omitted.

As shown in FIG. 10, an optical head apparatus 201 comprises a first semiconductor element 11 for emitting a laser beam (optical beam) L1 having a wavelength of 660 nm and a second semiconductor element 21 for emitting a laser beam (optical beam) L2 having a wavelength of 630 nm.

The semiconductor laser elements 11 and 12 are arranged in such a manner that the polarization directions of the laser beams L1 and L2 emitted from them are at right angles to each other.

The laser beam L1 emitted from the first semiconductor laser element 11 is first collimated by a first collimator lens 12 and then passes through the polarized beam-splitting face 31a of the polarized beam splitter 31. Subsequently, the laser beam L1 is incident on a λ/4 plate (retarder) 32, by which the direction of polarization is changed from linear polarization to circular polarization. Thereafter, the laser beam L1 is guided to an object lens 33.

By the object lens 33, the laser beam L1 is focused on the recording layer (not shown) of an optical disk (i.e., an optical information medium). The recording layer is a pigment layer interposed between a transparent support member and a reflecting film.

The laser beam L1 focused on the recording layer of the optical disk D is reflected by the reflecting film and returned to the object lens 33. Then, the laser beam L1 is incident on the λ/4 plate 32 once again, by which the direction of polarization is changed from circular polarization to linear polarization. The direction of this linear polarization is 90° shifted from that of the laser beam L1 that is directed to the optical disk D. Thereafter, the laser beam L1 is returned to the polarized beam splitter 31.

The laser beam L1 returned to the polarized beam splitter 31 is reflected by the polarized beam-splitting face 31a. Then, the laser beam L1 passes through a half-mirror beam splitter 34, the transmittance of which is about 20%, and further passes through a band-pass filter 211, which allows only the light components of a predetermined wavelength to pass therethrough. Subsequently, the laser beam L1 is focused by a focusing lens 35 and is then incident on the light receiving face (not shown) of a photodetector 36. The band-pass filter 211 is designed to allow transmission of only a laser beam having a wavelength of 660 nm, i.e., the laser beam emitted from the first laser element 11.

On the other hand, the laser beam L2 emitted from the second semiconductor laser element 21 and having a wavelength of 630 nm is first collimated by a second collimator lens 22 and is then incident on an apodization plate 111. By this plate 111, a central portion of the collimated beam, as viewed in a cross section, is shielded at a predetermined rate. In other words, the cross sectional diameter of the collimated beam is reduced to a small value in comparison to that of an ordinary laser beam. (The cross sectional diameter is defined as energy intensity.) After the diameter defined as energy intensity is reduced in this manner, the laser beam L2 is incident on the half-mirror beam splitter 34. About 80% of the laser beam L2 (the percentage being determined in terms of the optical intensity) is reflected by the half-mirror beam splitter 34 and guided to the polarized beam splitter 31. (It is desirable that at least three fourths of the laser beam be reflected by the half-mirror beam splitter 34.)

The laser beam L2 from the second semiconductor laser element 21 is reflected again by the polarized beam-splitting face 31a of the polarized beam splitter 31. (The laser beam L2 is reflected since its direction of polarization is 90° shifted from that of the laser beam L1 emitted from the first semiconductor laser element 11.) The reflected laser beam is incident on the λ/4 plate 32, by which the direction of polarization is changed from linear polarization to circular polarization. Thereafter, the laser beam L2 is guided to the object lens 33.

By the object lens 33, the laser beam L2 from the second semiconductor laser element 21 is focused on the recording layer (not shown) of the optical disk D. (The recording layer is a pigment layer interposed between the transparent support member and the reflecting film.)

The laser beam L2 emitted from the second semiconductor laser element 21 and focused on the recording layer of the optical disk D is reflected by the reflecting film and returned to the object lens 33. Then, the laser beam L1 is incident on the λ/4 plate 32 once again, by which the direction of polarization is changed from circular polarization to linear polarization. The direction of linear polarization is 90° shifted from that of the laser beam L2 that is directed to the optical disk D. Thereafter, the laser beam L2 is returned to the polarized beam splitter 31. Of the laser beam L2 returned to the polarized splitter 31, some components may travel toward the half-mirror beam splitter 34. Even if this happens, such components do not fall on the photodetector 36 due to the presence of the band-pass filter 36 described above. In this manner, outputs from the photodetector 36, i.e., the information recorded on the recording medium D, can be reproduced without being affected by noise.

Figure 11:
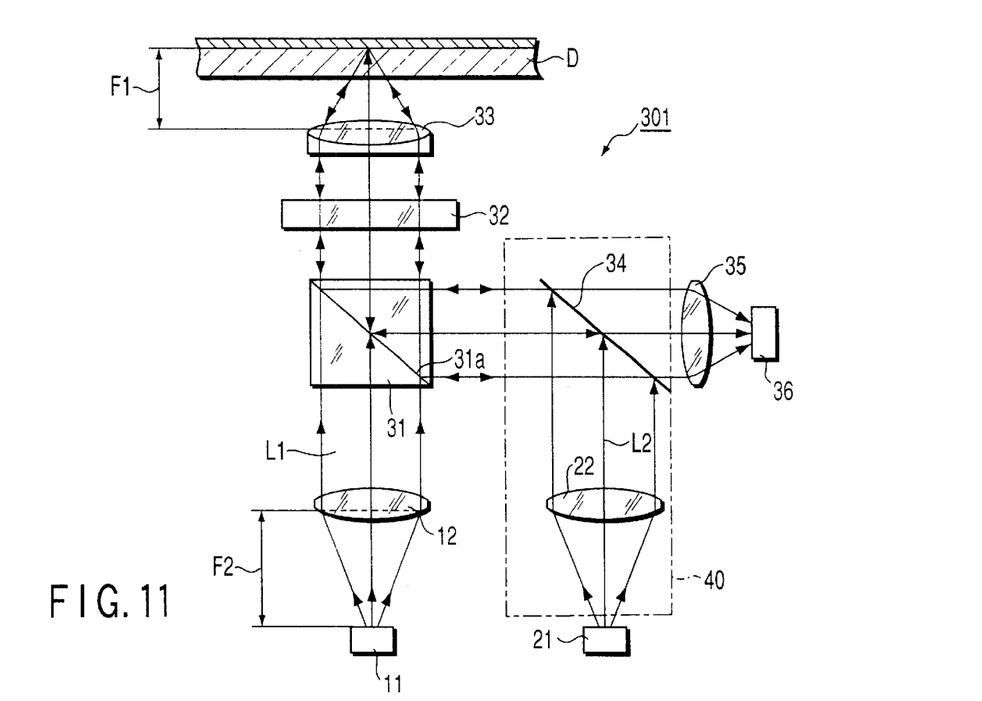
FIG. 11 is a schematic illustration showing a method in which to synthesize two laser beams together with a high degree of accuracy in the optical head apparatus shown in FIG. 1 is employed.

FIG. 11 illustrates a method in which the optical head apparatus shown in FIG. 1 controls two laser beams to form spots at the same position with high accuracy. The construction shown in FIG. 11 is similar to that shown in FIG. 1. The first and second laser elements 11 and 21 are adapted to emit laser beam of 780 nm and 660 nm, respectively.

Referring to FIG. 11, consideration will be given of distance F1 and distance F2. Distance F1 is the distance between the front focal plane (not shown) of the object lens 33 and the recording layer (not shown) of the recording medium D (normally, distance F1 is equivalent to the focal distance f33 of the object lens 33). Distance F2 is the distance between the light emission point of the first laser element 11 and the front focal plane (not shown) of the first collimator lens 12 (normally, distance F2 is equivalent to the focal distance f12 of the collimator lens 12.)

Ratio F2/F1 will be discussed in relation to the characteristics of the optical head apparatus 1.

If the light emission point should be shifted from the optimal position due to vibration or shock when F2/F1 is set at 1, the position where a beam spot is formed will be shifted, accordingly.

If the light emission point should be shifted from the optimal position when F2/F1 is set at 5, the position where a beam spot is formed will be shifted, but the amount of this shift is ⅕.

The radiation angle at which an ordinary laser element emits a laser beam is about 15°. Assuming that the effective diameter of the collimator lens 12 is 5 mm, distance F2 is 20 mm, the efficiency with which light is utilized (i.e., the amount in which the emitted from the laser element is incident on the collimator lens) is ¼. The power which the laser beam requires for recording on the recording surface is 15 mW or so. Since the output of the ordinary type of laser element is 80 W or thereabouts, the efficiency with which light is utilized should be not less than ¼ in consideration of every optical loss which may be incurred. If the efficiency is small than ¼, information may not be recorded in the recording surface.

The focal length of the object lens 33 is about 2 mm. Accordingly, the upper limit of F2/F1 is 10.

In view of the foregoing, it is desirable that the object lens 33 and collimator lens 12 (22) of the optical head apparatus 1 be arranged in such a manner that the ratio F2/F1 is greatest but does not exceed 10. In accordance with an increase in F2/F2, however, the distance between the light emission point of the laser element and the collimator lens lengthens, adversely affecting the efficiency with which light is utilized. If a large polarized beam splitter 31, a large object lens 33, a large collimator lens 12 (2) and a high-output laser element are employed, a decrease in the light utilization efficiency can be prevented, with a constant ratio F2/F1 maintained. In this case, however, the optical head apparatus is inevitably large in size.

Apart from the above, the two laser elements are positioned and fixed as follows. First, one of the two laser elements is fixed at the predetermined position. Then, the other laser element is positioned in such a manner that the beam spot formed by the laser beam emitted therefrom overlaps with the beam spot of the laser beam emitted from the fixed laser element. When the two beam spots overlap with each other, the second laser element is fixed by use of an adhesive. During this fixing operation, however, it is very likely that the laser element will be shifted from the intended position by 2 µm or so. Since the beam spot diameter of the laser beam utilized in the optical head apparatus of the present invention is about 1 µm, the beam spot must be formed as accurately as possible. In order for the beam spot shift on the recording face to be within the range of 0.5 µm even where the laser element is 2 µm shifted from the intended position in the manufacture process, it is required that the value of F2/F1 be larger than 4. Accordingly, F2/F1 should be within the range of 4 to 10. It is desirable that the two laser elements be integrally fixed to one and the same housing, as shown in FIG. 12.

Figure 12:
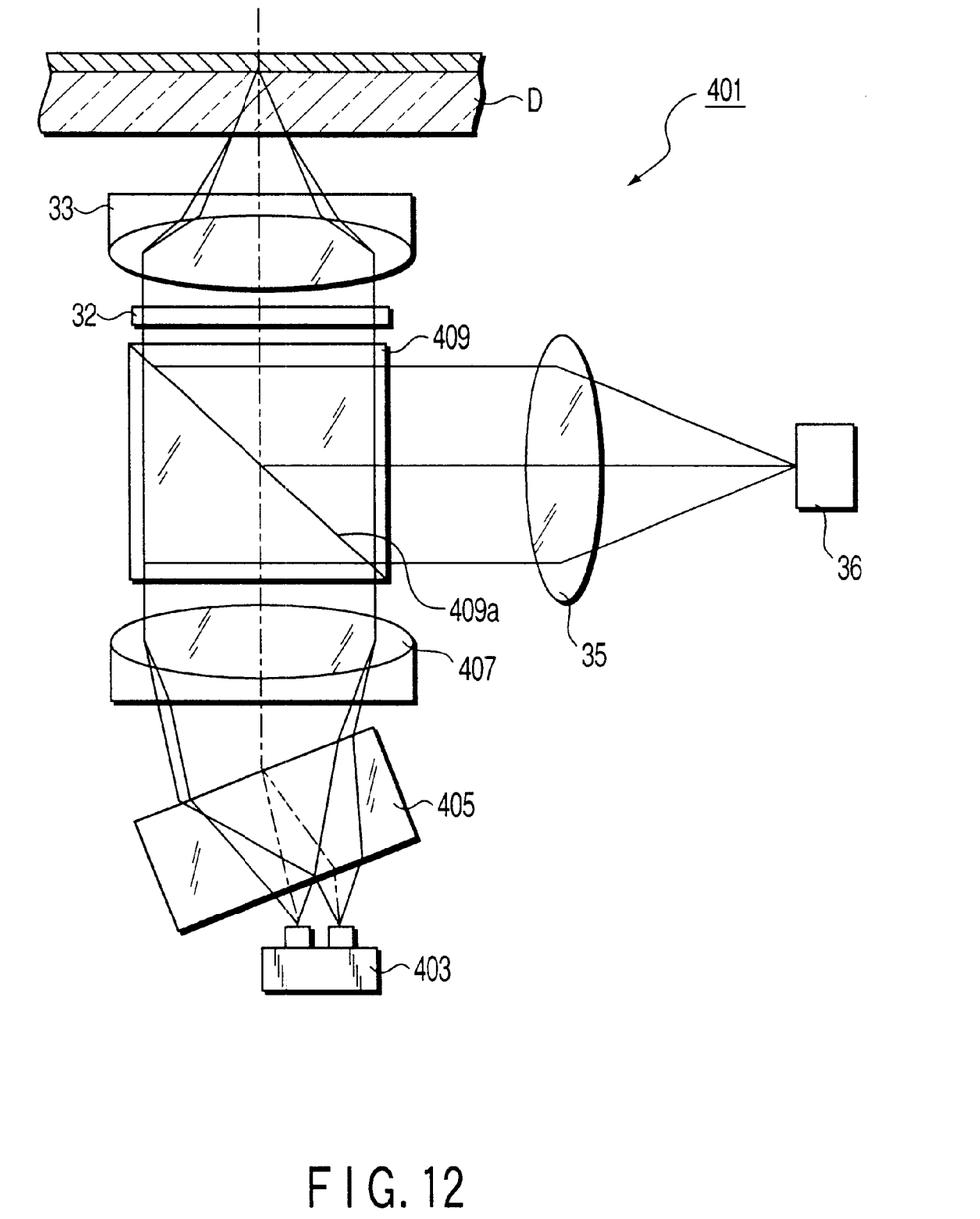
FIG. 12 is a schematic illustration of an example of an optical head apparatus that employs a laser unit in which two laser chips are integrally incorporated.

FIG. 12 is a schematic illustration of an example of an optical head apparatus that employs a laser unit in which two laser chips are integrally incorporated. In FIG. 12, those structural elements similar to those shown in FIG. 1 are denoted by the same reference numerals, and a detailed description of such structural elements will be omitted.

As shown in FIG. 12, an optical head apparatus 401 comprises: a semiconductor laser unit 403 in which two laser chips (elements) capable of emitting laser beams L1 and L2 polarized in the same direction are integrally incorporated; an optical path-changing member (plane-parallel plate glass) 405 for guiding the two laser beams of the laser unit 403 to substantially the same optical path; a collimator lens 407 for collimating the two laser beams L1 and L2 so that the laser beams can travel along substantially the same optical path; a polarized beam splitter 409 for allowing the collimated laser beams L1 and L2 output from the collimator lens 407 to pass therethrough and travel to a recording medium D; a λ/4 plate (retarder) 32 for isolating the laser beam output from the polarized beam splitter 409 and traveling to the recording medium D from the laser beam reflected by the recording medium; an object lens 33 for focusing the laser beam, the direction of polarization has been changed by the retarder 32, on the recording layer of the recording medium D; and a focusing lens 411 for the laser beam reflected by the recording surface of the recording medium D on a photodetector 36. The laser beam reflected by the recording surface of the recording medium D is captured by the object lens 33 and is then incident on the retarder 32. By this retarder 32, the direction of polarization is 90° shifted from that of the laser beam L2 that is directed to the optical disk D. Subsequently, the laser beam is reflected by the polarized beam-splitting face 31a of the polarized beam splitter 31, and this reflected laser beam is incident on the focusing lens 411.

The focusing lens 411 is made from a material which is passed allows only the laser beam reflected by the recording medium D and representing the information recorded in the recording medium D, if the laser beams emitted from the two laser chips are different in wavelength.

A band-pass filter, such as that shown in FIG. 10, may be arranged between the focusing lens 411 and the polarized beam splitter 409, so as to allow transmission of only the laser beam emitted from one of the laser chips. If such a band-pass filter is employed, the focusing lens 411 need not have a filtering function.

Let us assume that one of the laser chips of the laser unit 403 emits a laser beam L1 of 780 nm and the other laser chip emits a laser beam L2 of 660 nm, as in the embodiment described above. In this case, the two laser beams L1 and L2 emitted from the laser unit 403 are guided by the plane-parallel plate glass 405 to substantially the same optical path. After being collimated by the collimator lens 407, the laser beams L1 and L2 pass through the polarized beam-splitting face 409a of the polarized beam splitter 409. Then, the laser beams L1 and L2 are incident on the λ/4 plate (retarder) 32, by which the direction of polarization is changed from linear polarization to circular polarization. Thereafter, the laser beams L1 and L2 are guided to the object lens 33.

By the object lens 33, the laser beams L1 and L2 are focused on the recording layer (not shown) of the optical disk D, i.e., an optical information medium. (The recording layer is a pigment layer interposed between the transparent support member and the reflecting film.)

The laser beams L1 and L2 focused on the recording layer of the optical disk D and reflected by the reflecting film are returned to the object lens 33. Then, the laser beams L1 and L2 are incident on the λ/4 plate 32 once again, by which the direction of polarization is changed from circular polarization to linear polarization. The direction of linear polarization is 90° shifted from that of the laser beams that are directed to the optical disk D. Thereafter, the laser beams L1 and L2 are returned to the polarized beam splitter 409.

The laser beams L1 and L2 returned to the polarized beam splitter 409 are reflected by the polarized beam-splitting face 409a. Only one of the two laser beams is allowed to pass through the focusing lens 411, and incident on the light-receiving surface of the photodetector 36.

In the optical head apparatus shown in FIG. 12, power control is performed, for example, as follows. The power of one of the two laser beams is used for reproduction (which power is less intensive), and the power of the other laser beam is used for recording (which power is intensive). The power of the laser beam for recording is modulated in intensity in accordance with recording signals, i.e., information to be recorded. By executing this power control, the recording time is short, and yet information can be recorded in a reliable manner. In addition, information can be reproduced from the recording medium by using the laser beam from at least one laser chip.

As described above, according to the recording method of the present invention, information can be recorded in a write-once recordable optical information medium by causing a large amount of energy to be absorbed in the recording layer of the medium, without any deterioration in the characteristics of reproduced signals. Accordingly, the recording speed can be as short as possible.

The emission wavelength of the laser element that emits a recording laser beam can be set at the wavelength that provides a greatest energy absorption coefficient with respect to the recording layer of a recording medium. Even if the wavelength of the recording laser beam fluctuates, the variation of the recording sensitivity is suppressed. Since recorded signals are free from fluctuations, stable information recording is thus enabled.

In regard to distance F1 between the front focal plane of the object lens 33 and the recording layer of the recording medium D and distance F2 between the light emission point of the first laser element and the front focal plane of the first collimator lens 12, the present invention has provided optimal relationships between the two distances F1 and F2. With the ratio F2/F1 being set at an optimal value, the optical head apparatus can operate without being adversely affected by vibration or shock. In addition, a beam spot is prevented from being shifted from the intended position even if the two laser elements (chips) are not fixed accurately at the right positions during assembly. Accordingly, stable recording/reproduction of information is enabled.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical information recording/reproducing apparatus comprising a plurality of light sources, one of which emits an optical beam having such a wavelength as enables a larger amount of energy to be absorbed or reflected by recorded areas of a recording layer of an optical information medium than an amount of energy absorbed or reflected by non-recorded areas, said plurality of light sources emitting optical beams simultaneously to record information in an information recording mode;

wherein said plurality of light sources include a first light source and a second light source, at least one of which emits a light beam having a wavelength that enables a change rate of an absorption coefficient of unrecorded areas of the optical information medium to be within a range of ±5% when the wavelength changes in a range of ±10%.

* * * * *

(12) EX PARTE REEXAMINATION CERTIFICATE (7875th)
United States Patent
Higashino (10) Number: US 6,456,575 C1
(45) Certificate Issued: Nov. 16, 2010

(54) METHOD FOR RECORDING INFORMATION IN OPTICAL INFORMATION MEDIUM AND REPRODUCING INFORMATION THEREFROM

(75) Inventor: Hiroyuki Higashino, Kawasaki (JP)

(73) Assignee: Kabushiki Kaisha Toshiba, Saiwai-Ku, Kawasaki-Shi (JP)

Reexamination Request:
No. 90/008,718, Jun. 15, 2007

Reexamination Certificate for:
Patent No.: 6,456,575
Issued: Sep. 24, 2002
Appl. No.: 09/398,002
Filed: Sep. 16, 1999

(30) Foreign Application Priority Data

Oct. 15, 1998 (JP) ............................................. 10-293712
Sep. 10, 1999 (JP) ............................................. 11-257706

(51) Int. Cl.
*G11B 7/0045* (2006.01)
*G11B 7/125* (2006.01)
*G11B 7/00* (2006.01)
*G11B 7/135* (2006.01)

(52) U.S. Cl. .................. 369/47.51; 369/121; G9B/7.01; G9B/7.103

(58) Field of Classification Search ......................... None
See application file for complete search history.

(56) References Cited

U.S. PATENT DOCUMENTS 4,412,231 A * 10/1983 Namba et al. ............. 346/135.1
4,766,582 A * 8/1988 Ando ...................... 369/44.24

FOREIGN PATENT DOCUMENTS

JP 2-187937 7/1990

OTHER PUBLICATIONS

Morio Ogami, et al., "Optical Disk Technology" Radio Technology KK, Feb. 10, 1989, ISBN 4-8443-0196-5, pp. 24-26.

* cited by examiner

*Primary Examiner*—Albert J Gagliardi (57) ABSTRACT

An optical head apparatus is provided with a first laser element, a second laser element and a polarized beam splitter. The first laser element emits a laser beam having a first wavelength. The second laser element emits a laser beam having a second wavelength. The second wavelength may be equivalent to the first wavelength, alternatively, it may be different from the first wavelength. The polarized beam splitter enables the laser beams of the first and second laser elements to be simultaneously radiated to the recording layer of an optical disk. When information are recorded in the optical disk, the laser beams of the first and second laser elements are used at the same time. At least one of the laser elements emits a laser beam having such a wavelength as enables the recording layer of the optical disk to absorb the largest possible amount of energy.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 1 is cancelled.

* * * * *